(12) United States Patent
Kerman

(10) Patent No.: US 8,528,749 B2
(45) Date of Patent: Sep. 10, 2013

(54) FREE-STANDING STORAGE RACK FOR ONE OR MORE BICYCLES

(76) Inventor: David Kerman, Sherman Oaks, CA (US)

(*) Notice: Subject to any disclaimer, the term of this patent is extended or adjusted under 35 U.S.C. 154(b) by 226 days.

(21) Appl. No.: 12/986,508

(22) Filed: Jan. 7, 2011

(65) Prior Publication Data

US 2011/0240572 A1    Oct. 6, 2011

(51) Int. Cl.
  *B62H 3/00*    (2006.01)
  *B62H 3/12*    (2006.01)
  *A47F 5/04*    (2006.01)

(52) U.S. Cl.
  USPC ............................................ 211/22; 211/196

(58) Field of Classification Search
  USPC ................ 211/17–22, 196, 205, 103, 106.01, 211/197, 1.3, 204, 206, 94.01, 85.7; 248/290, 248/289.1, 297.2, 200.1; D6/552, 566; D12/115; 206/304
  See application file for complete search history.

(56) References Cited

U.S. PATENT DOCUMENTS

| | | | | |
|---|---|---|---|---|
| 2,961,212 A * | 11/1960 | Beal | ............................ | 248/200.1 |
| 3,462,110 A * | 8/1969 | Cheslock | .................... | 248/219.4 |
| 3,771,466 A * | 11/1973 | Ferdinand et al. | ............ | 108/109 |
| 4,813,550 A * | 3/1989 | Saeks | ............................... | 211/17 |
| 5,078,276 A * | 1/1992 | Rogge et al. | ..................... | 211/18 |
| 5,083,729 A * | 1/1992 | Saeks et al. | ...................... | 211/22 |
| 5,161,768 A * | 11/1992 | Sarabin | ......................... | 248/525 |
| 5,188,323 A * | 2/1993 | David | ............................ | 248/158 |
| 5,332,104 A * | 7/1994 | Santella | .......................... | 211/18 |
| 5,820,086 A * | 10/1998 | Hoftman et al. | ............ | 248/125.2 |
| 5,842,581 A * | 12/1998 | Graefe | ............................ | 211/17 |
| 5,941,397 A * | 8/1999 | Buchanan et al. | .............. | 211/19 |
| 6,164,459 A * | 12/2000 | Liem | ................................. | 211/5 |
| D437,164 S * | 2/2001 | Fickett | .......................... | D6/552 |
| 6,182,836 B1 * | 2/2001 | Gutierrez | ........................ | 211/22 |
| 6,843,380 B1 * | 1/2005 | Fickett | ........................... | 211/22 |
| 6,871,749 B2 * | 3/2005 | Bostick et al. | ............. | 211/94.01 |
| D535,512 S * | 1/2007 | Eastman | ........................ | D6/552 |
| 7,604,131 B1 * | 10/2009 | Clark et al. | ...................... | 211/17 |
| 7,703,728 B2 * | 4/2010 | Petrick et al. | .............. | 248/188.7 |
| 2004/0129656 A1 * | 7/2004 | Garcia Simon et al. | ........ | 211/22 |
| 2012/0043286 A1 * | 2/2012 | Noyes | .............................. | 211/22 |

* cited by examiner

*Primary Examiner* — Jennifer E Novosad
(74) *Attorney, Agent, or Firm* — James A. Italia; Italia IP

(57) ABSTRACT

The free-standing bicycle rack includes a base having at least two legs, a vertical support member projecting from the base, and a hook attached to the vertical support member for holding the wheel of a bicycle, such that the bicycle is stored in a vertical orientation. The bicycle rack is readily expandable to accommodate different numbers of bicycles, and the hook may be repositioned to different heights to accommodate bicycles of different sizes.

10 Claims, 9 Drawing Sheets

FREE-STANDING STORAGE RACK FOR ONE OR MORE BICYCLES

TECHNICAL FIELD

The present disclosure is directed to the field of free-standing storage racks, and, specifically, to a free-standing bicycle rack that stores at least one bicycle in a vertical orientation and that is readily adaptable to storing multiple bicycles in a vertical orientation.

BACKGROUND

Bicycle owners face a common dilemma in the storage of their bicycles. Some people who live in single-family dwellings store their bicycles in a garage, carport, or basement. Apartment dwellers and college students often transport their bicycles to their apartments or dorm rooms, where they are parked in a hallway, foyer, or bedroom. Regardless of their home type, bicycle owners have needed several feet of uninterrupted horizontal storage space to accommodate their bicycle. Storage needs are further complicated if multiple bicycles are to be stored.

In many instances, rather than simply leaning it on its kickstand, a bike owner would prefer to store his bicycle on wall-mounted hooks or a stand to prevent the bicycle from leaving mud or dirt on the floor and to prevent the handlebars from scuffing the walls. Traditional bicycle stands support the bicycle in a riding position—that is, in a generally horizontal orientation—that requires storage space at least the length of the bicycle. Mounting these types of stands to a wall typically requires the insertion of long bolts into wall studs to support the weight of the bicycle (as much as 30 pounds) and stand, which may be problematic for several reasons. First, the wall studs or joists may not be located in areas practical for the storage of the bicycle. Also, if the bicycle owner lives in an apartment, some other rental property, or dormitory, he may be prohibited from bolting items to the wall.

What is needed is a bicycle storage system that is free-standing and self-supporting without being secured to a wall, floor, ceiling, or other support surface. Also needed is a storage rack or system that orients a bicycle in a vertical orientation, so that less floor space is needed per bicycle. An additional need not currently met by the industry is modularity of a storage rack or system, meaning that the rack is readily and quickly adaptable to the storage of multiple bicycles in different arrangements to accommodate various room layouts and storage requirements.

SUMMARY

The present disclosure provides an aesthetically pleasing, functional, versatile solution to the problems associated with bicycle storage. The free-standing bicycle rack includes a base having at least two legs, a vertical support member projecting from the base, and a hook attached to the vertical support member for holding the wheel of a bicycle, such that the bicycle is stored in a vertical orientation. The bicycle rack is readily expandable to accommodate different numbers of bicycles, and the hook may be repositioned to different heights to accommodate bicycles of different sizes.

According to a first aspect, a free-standing bicycle rack includes a base; a vertical support member projecting from the base; and a hook attached to the vertical support member; the base comprising at least a first support leg and a second support leg spaced apart from the first support leg; wherein the hook is configured to engage the front wheel of a bicycle and to hold the bicycle in a vertical orientation with the back wheel contacting at least one of the vertical support member, the first support leg, and the second support leg.

BRIEF DESCRIPTION OF DRAWINGS

A full and complete description of the present storage system is provided herein with reference to the appended figures, in which.

DETAILED DESCRIPTION

Reference is now made to the drawings for illustration of various free-standing storage racks for one or more bicycles. While the particular illustrations provided herein are directed to free-standing storage racks for bicycles having a universal slider attachment, various other attachment mechanisms (such as a threaded hook and threaded holes) may be equally applicable for the present storage racks. Moreover, while the bicycles illustrated are adult-sized road bicycles, bicycles of other types (such as mountain bikes) and sizes (such as children's bicycles) may be stored similarly. Further, whereas the present storage racks are shown as being made of tubular metal components, other materials may be used.

Figure 1:
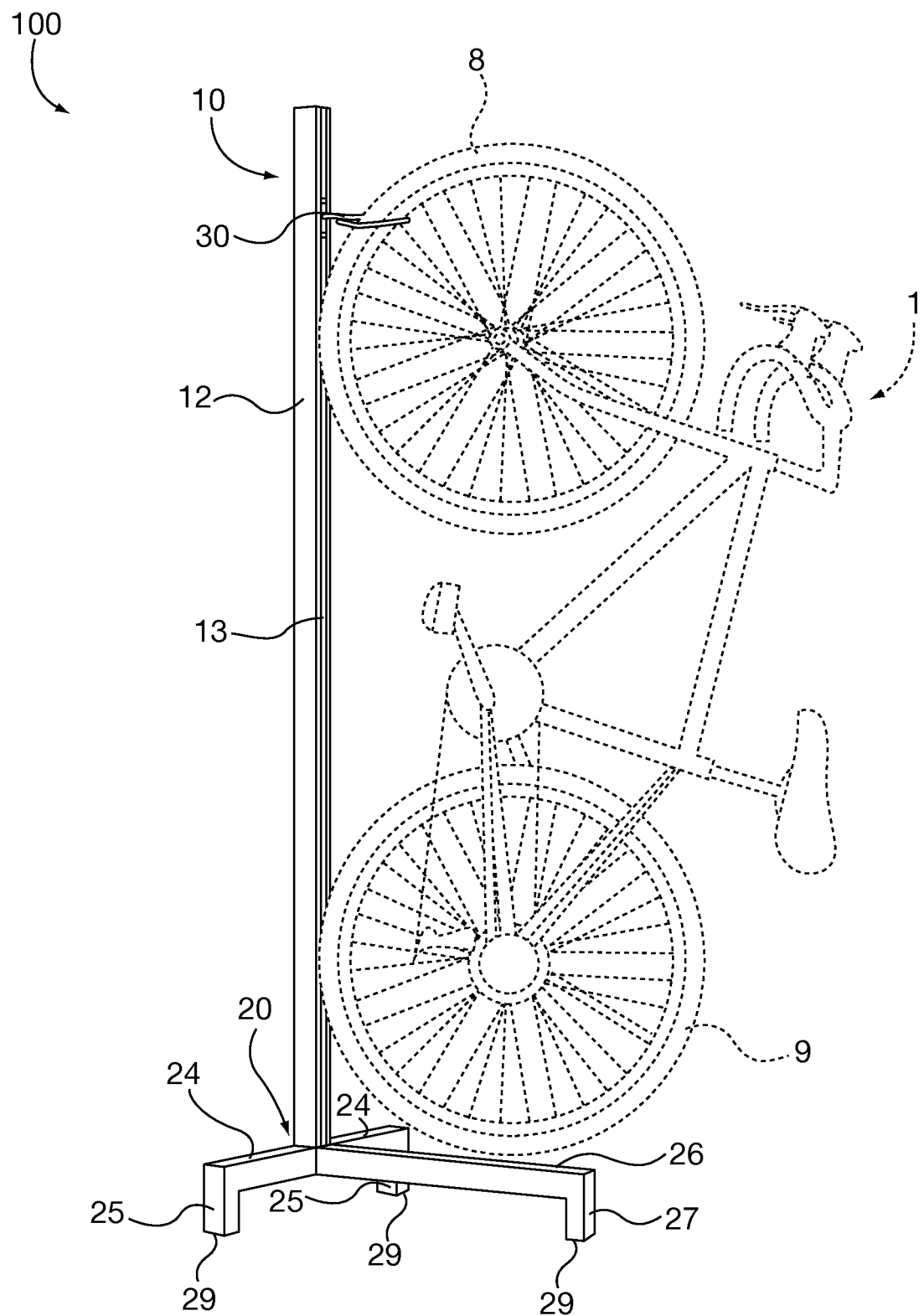
FIG. 1 is a perspective elevational view of a free-standing storage rack, according to the present disclosure, in which a single bicycle is being stored in a vertical orientation.

According to a first aspect shown in FIG. 1, a self-supporting bicycle rack 100 is provided for storing a bicycle 1 in a vertical orientation. The rack 100, which may also be referred to as a storage system, includes a vertical support member 10, a base 20, and a hook 30. The vertical support member 10 has at least one attachment surface 12 that supports the tires of the bicycle 1. An attachment trough 13 may be incorporated within the attachment surface 12 for the provision of the hook 30 and, in one aspect, a universal slider attachment 60 (shown in FIG. 2).

The base 20 may be constructed of a first set of two oppositely disposed legs 24 and another support leg 26 that is positioned perpendicularly between the legs 24. The third leg 26 is located, in this exemplary version, beneath the rear wheel 9 of the bicycle 1 and is longer than the first pair of legs 24. In at least one assemblage, the leg 26 has a dimension approximating the diameter of the bicycle wheel. The distal ends of the legs 24, 26 are provided with feet 25, 27, which are substantially vertical relative to the legs 24, 26. In one aspect, the feet 25, 27 are positioned perpendicularly to the legs 24, 26 to form an L-shape, although other angles greater than 90 degrees may be used. For height adjustments and to ensure that the rack 100 is level, adjustable pedestals 29 may be attached to the bottom of the feet 25, 27. Further, it is contemplated that the feet of the adjustable pedestals may be adapted to removeably receive wheels or coasters to allow the user to easily maneuver the storage rack to any desired storage location. The wheels or coaters may have locking mechanisms as is common in the art.

The legs 24 (and 24, 26) may be connected to one another by any of various methods, including an interlocking system having a depressible button and a corresponding aperture (such as may be used in adjusting the length of a crutch). Other attachment methods include bolts, screws (for instance, into threaded receptacles), magnets, interlocking tabs, and the like. In the event that the modular bicycle rack 100 is to be a permanent fixture, the legs 24, 26 may also be welded to the vertical support member 10 and/or each other. Additionally, a multi-port connector piece, such as a T-shaped unit, may be used to connect the legs 24, 26 to one another and to the vertical support member 10, perhaps using the interlocking button and aperture described above. Further, it should be understood that any bicycle rack shown with multiple legs (e.g., 24) extending in an axial direction could be provided with a single leg extending the requisite length.

Figure 2:
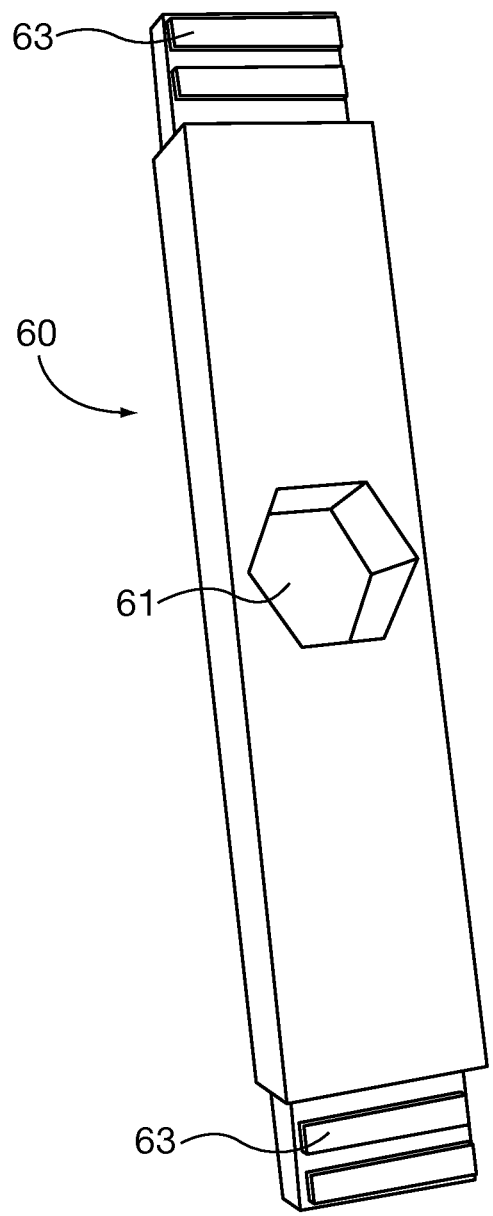
FIG. 2 is a perspective elevational view of a universal slider attachment, which may be used with the bicycle rack of FIG. 1.
Figure 3:
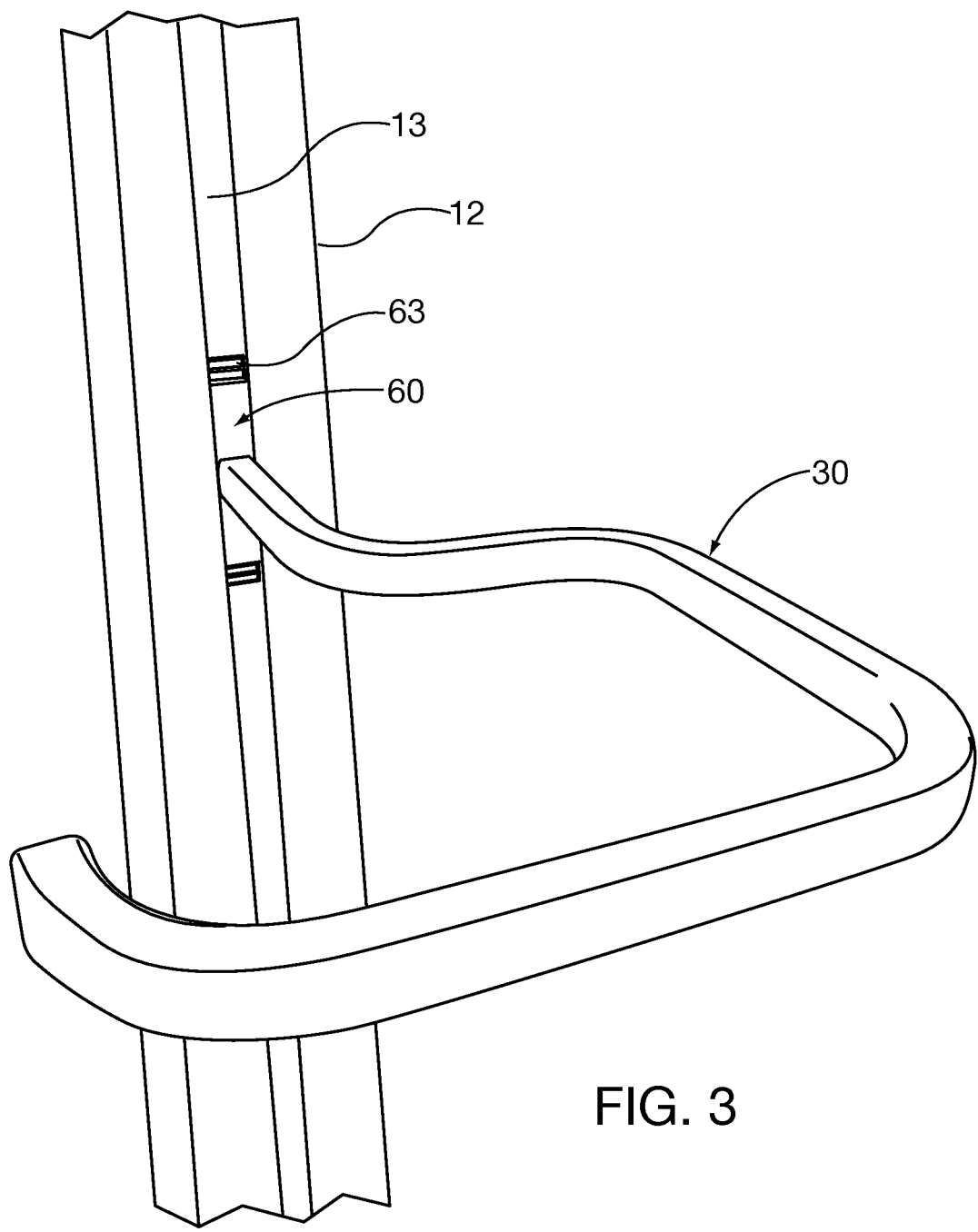
FIG. 3 is a perspective elevational view of a portion of a vertical support beam of FIG. 1, in which the universal slider attachment of FIG. 2 is installed and further illustrating a bicycle-bearing hook.

The hook 30 (shown in FIG. 3) has a shape resembling the curved portion of a question mark. As seen in FIG. 3, the shape includes straight line segments including a straight line segment extending to the right and left lateral sides of the vertical support member 10. The hook 30 may be provided with a threaded end, which is sized to engage a correspondingly threaded hole (not shown) in the trough 13. Alternately, as shown in FIGS. 2 and 3, a universal slider attachment 60 may be positioned within the trough 13, such that the teeth 63 of the slider attachment 60 engage ridges (not shown) in the valley of the trough 13. An aperture 61 in the slider attachment 60 receives the correspondingly shaped attachment end of the hook 30. Once the hook 30 is secured within the trough 13, the curved body of the hook 30 may be positioned through the spokes of the front wheel 8 of the bicycle 1 to hold the bicycle in its desired vertical orientation. The back wheel 9 of the bicycle 1 rests against the support member 10 and, optionally, the leg 26, depending on the height at which the hook 30 is positioned along the vertical support member 10. As seen in FIGS. 1 and 3, the hook 30 is arranged to occupy a horizontal plane when the vertical support member 10 is in the vertical orientation shown in FIG. 1. The hook 30 projects roughly equally to opposed sides of vertical support member 10.

The bicycle rack 100 may be modified to hold more than one bicycle, as shown in FIGS. 4 through 9.

Figure 4:
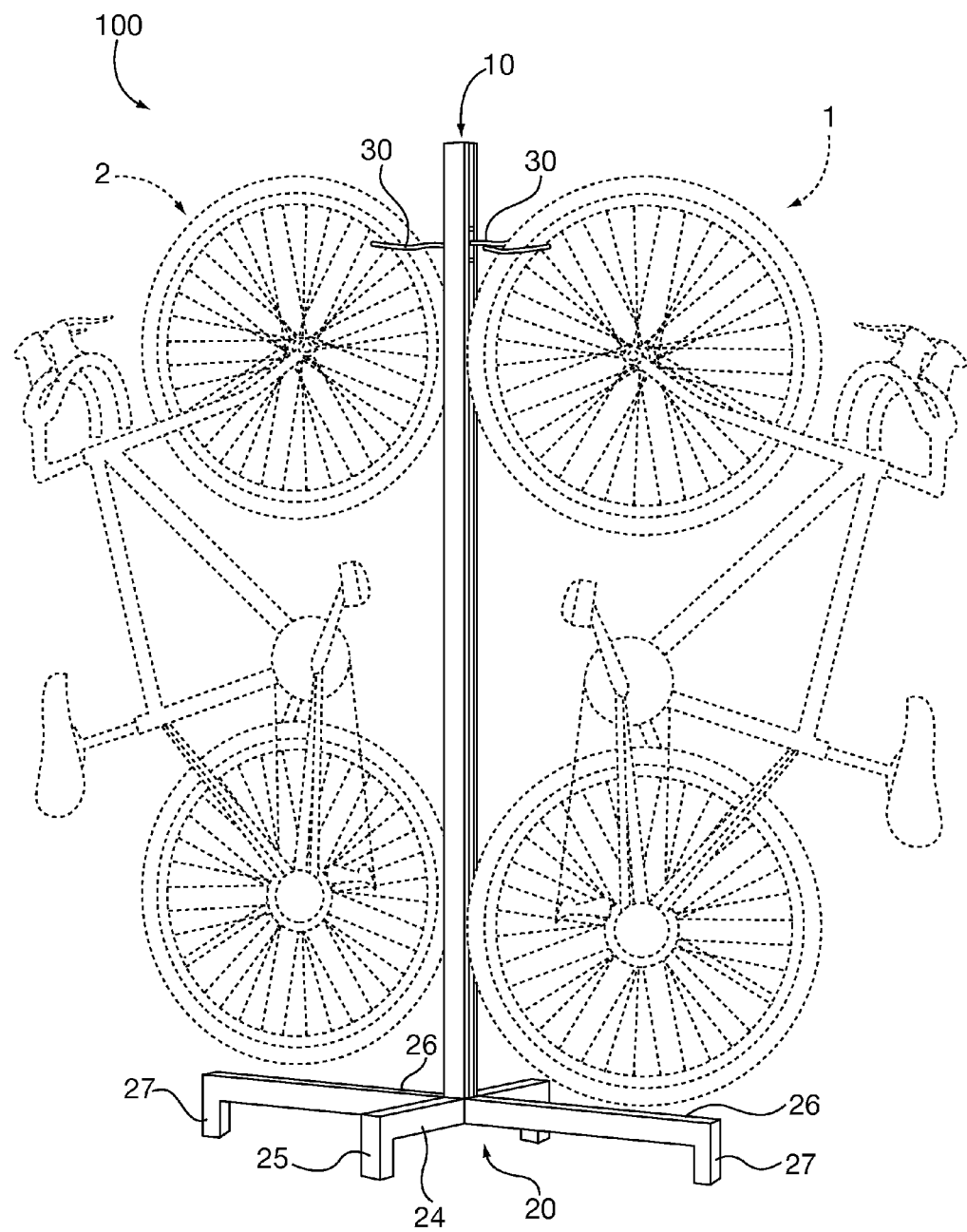
FIG. 4 is a perspective elevational view of an alternate storage rack, according to another aspect of the present disclosure, in which two bicycles are stored in a vertical orientation in a back-to-back arrangement.

In FIG. 4, two bicycles 1, 2 are oriented in a back-to-back arrangement, which may be useful when the bicycle rack 110 is to be positioned along an available length of wall to minimize the intrusion of the bicycles 1, 2 into a room. The base 20 includes an additional leg 26 that reinforces the rack 110 to accommodate the weight of the second bicycle 2. The legs 24 may be shorter than the legs 26 to allow the bicycle rack 110 to be housed in close proximity to a wall.

Figure 5:
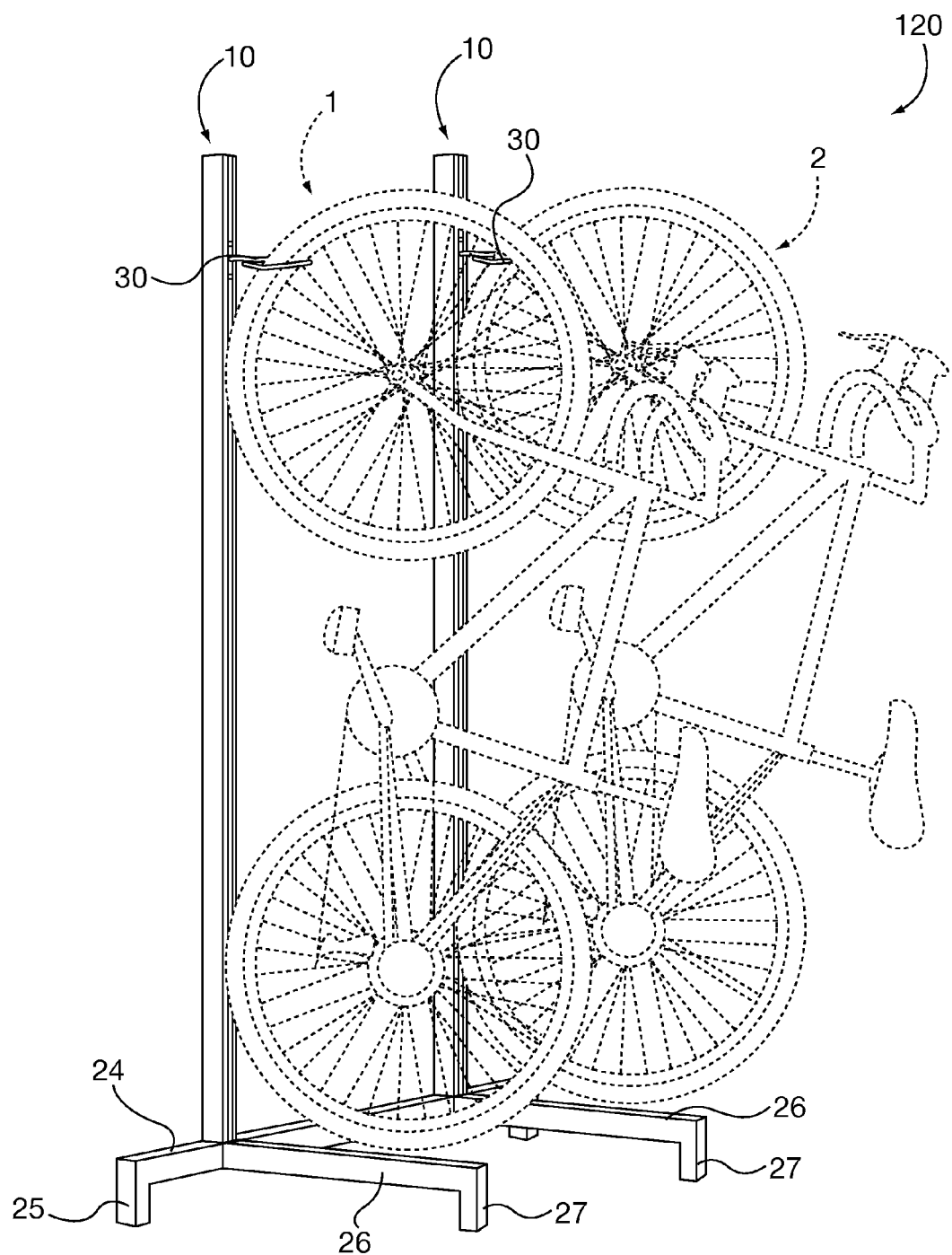
FIG. 5 is a perspective elevational view of yet another storage rack, in which two bicycles are stored in a vertical orientation in a right-angle arrangement.

An alternate variation of the bicycle rack 110 is shown in FIG. 5, in which a bicycle rack 120 is provided with a second vertical support member 10 to create a side-by-side storage arrangement. Each bicycle 1, 2 attaches to a hook 30 on a corresponding support member 10. The base 20 includes two under-tire legs 26 and a longitudinal leg 24 (which may be multiple segments joined together) that extends outboard of the first support member 10, between the first and second support members 10, and beyond the second support member 10. As before, the legs 24, 26 terminate in feet 25, 27 for stability and ease of movement.

Figure 6:
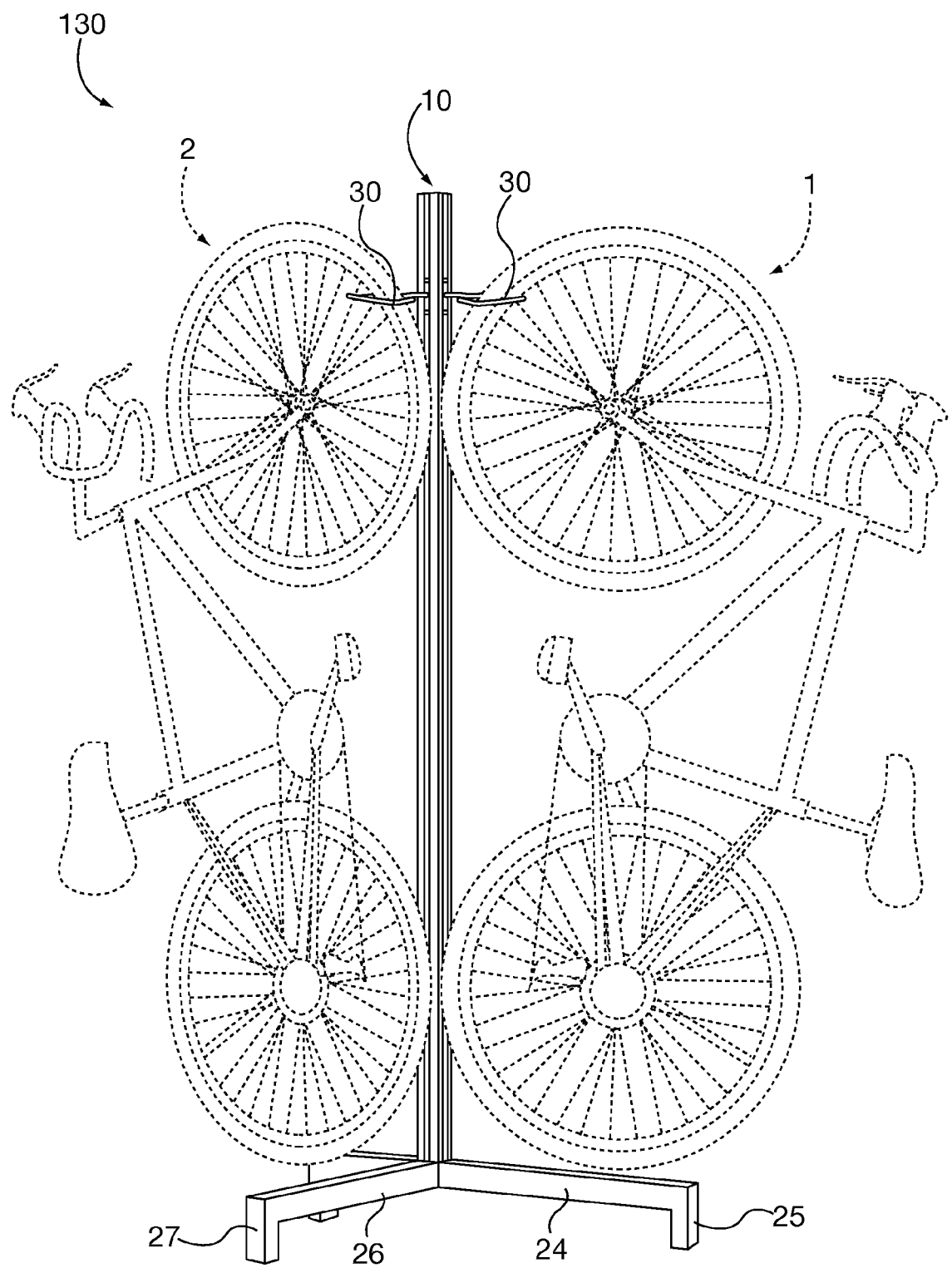
FIG. 6 is a perspective elevational view of a further storage rack, in which two bicycles are stored in a vertical orientation in a side-by-side arrangement.

FIG. 6 illustrates yet another variation of a bicycle rack for two bicycles 1, 2. A bicycle rack 130 includes a single vertical support member 10, which has been modified to include troughs 13 on two adjacent surfaces. When hooks 30 are attached to the troughs 13, the bicycles 1, 2 are arranged at a right angle with respect to one another. Such a configuration may be useful if the bicycle owner wants to store the bicycles 1, 2 in the corner of a room. The base 20 includes a leg 24 that resides beneath the rear wheel of the first bicycle (1) and extends beyond the vertical support member 10, as well as a second leg 26 that connects to the vertical support member 10 and the leg 24 to form a right angle with the leg 24. The longer leg 24 (in this exemplary structure) may be a single piece of square tubular material, or may be two separate pieces joined together, for instance, at the vertical support member 10.

Figure 7:
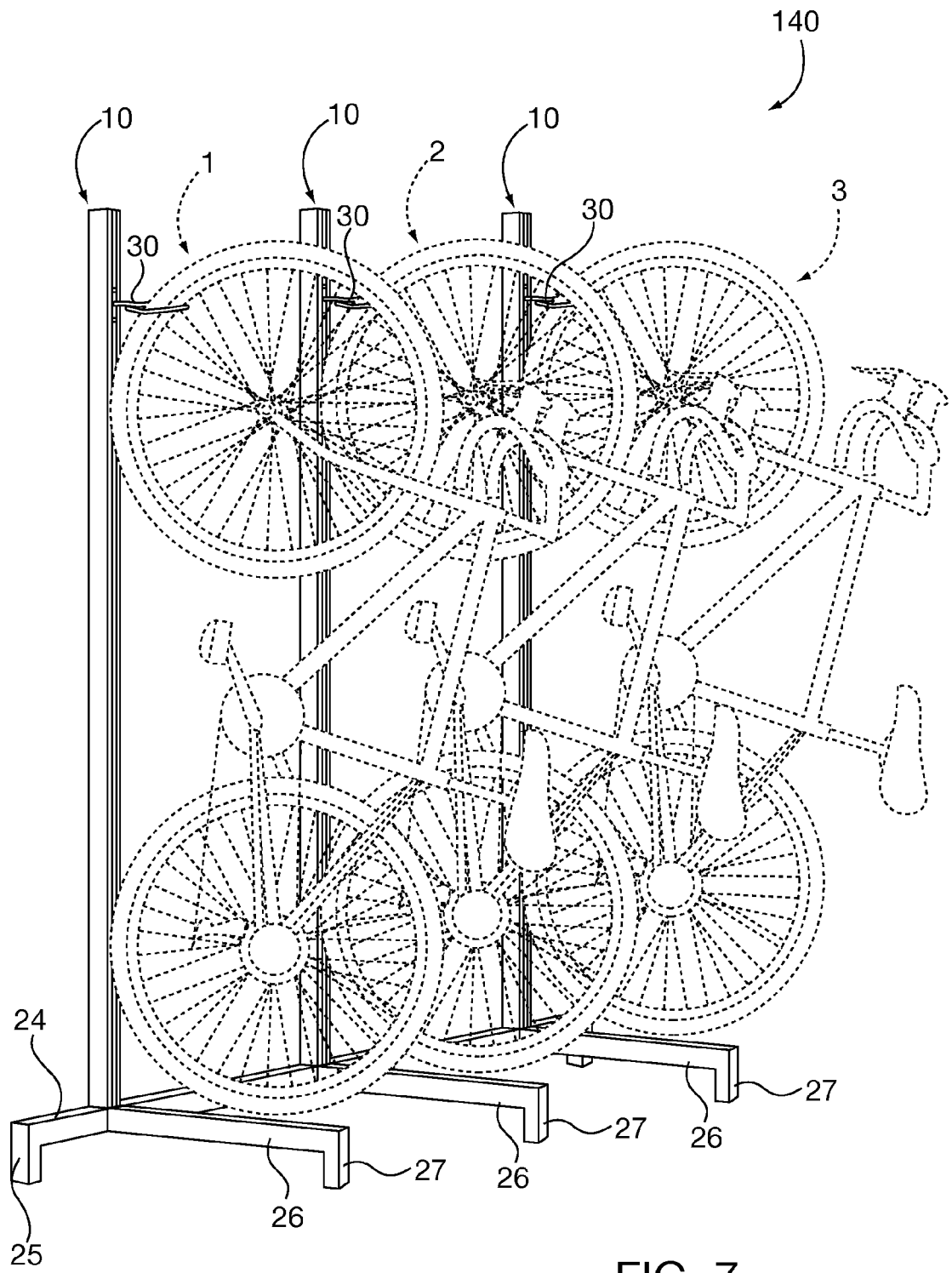
FIG. 7 is a perspective elevational view of a storage rack, according to yet another aspect provided herein, in which three bicycles are stored in a vertical orientation in a side-by-side arrangement.
Figure 8:
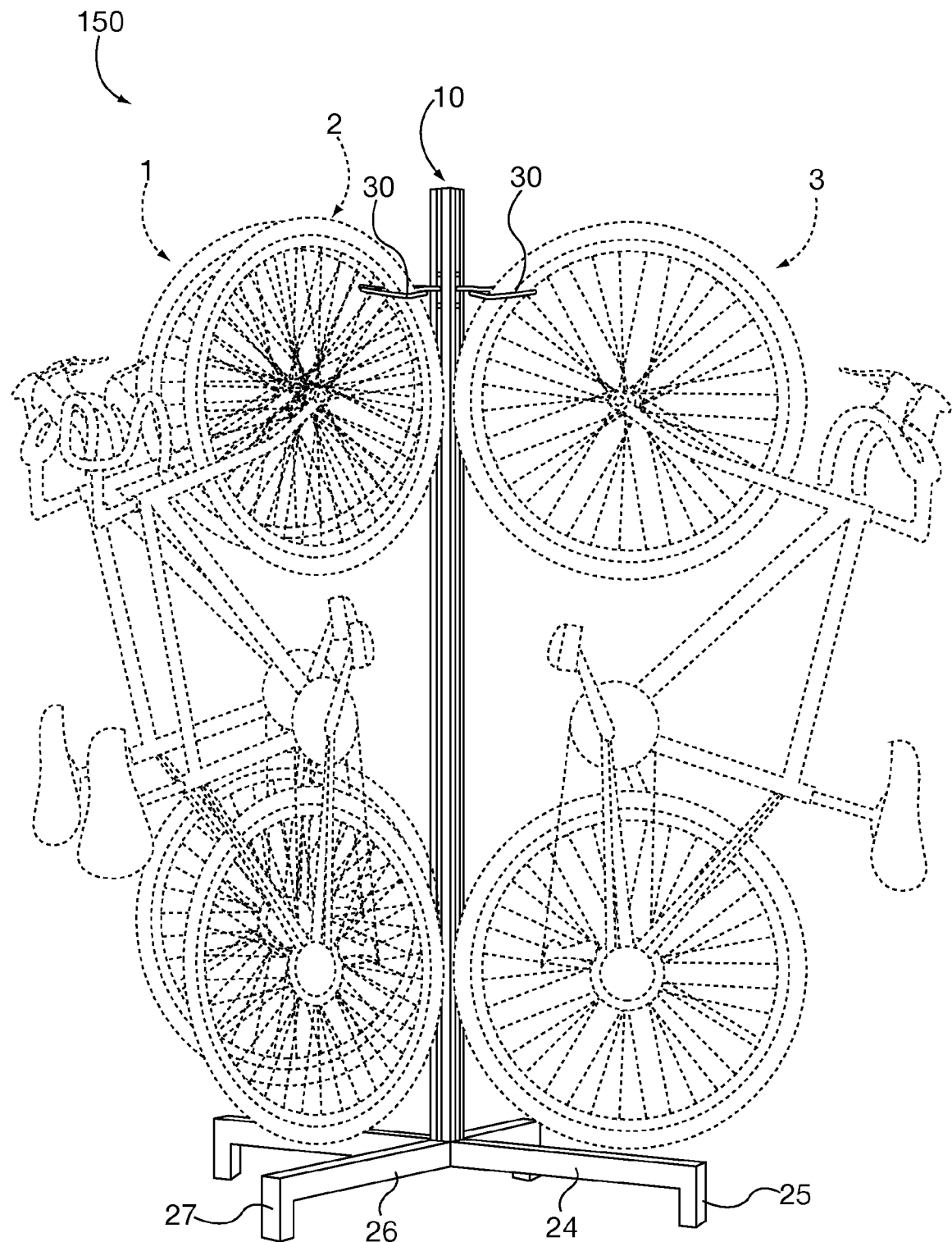
FIG. 8 is a perspective elevational view of yet another storage rack, in which three bicycles are stored in a vertical orientation in a right-angle arrangement.
Figure 9:
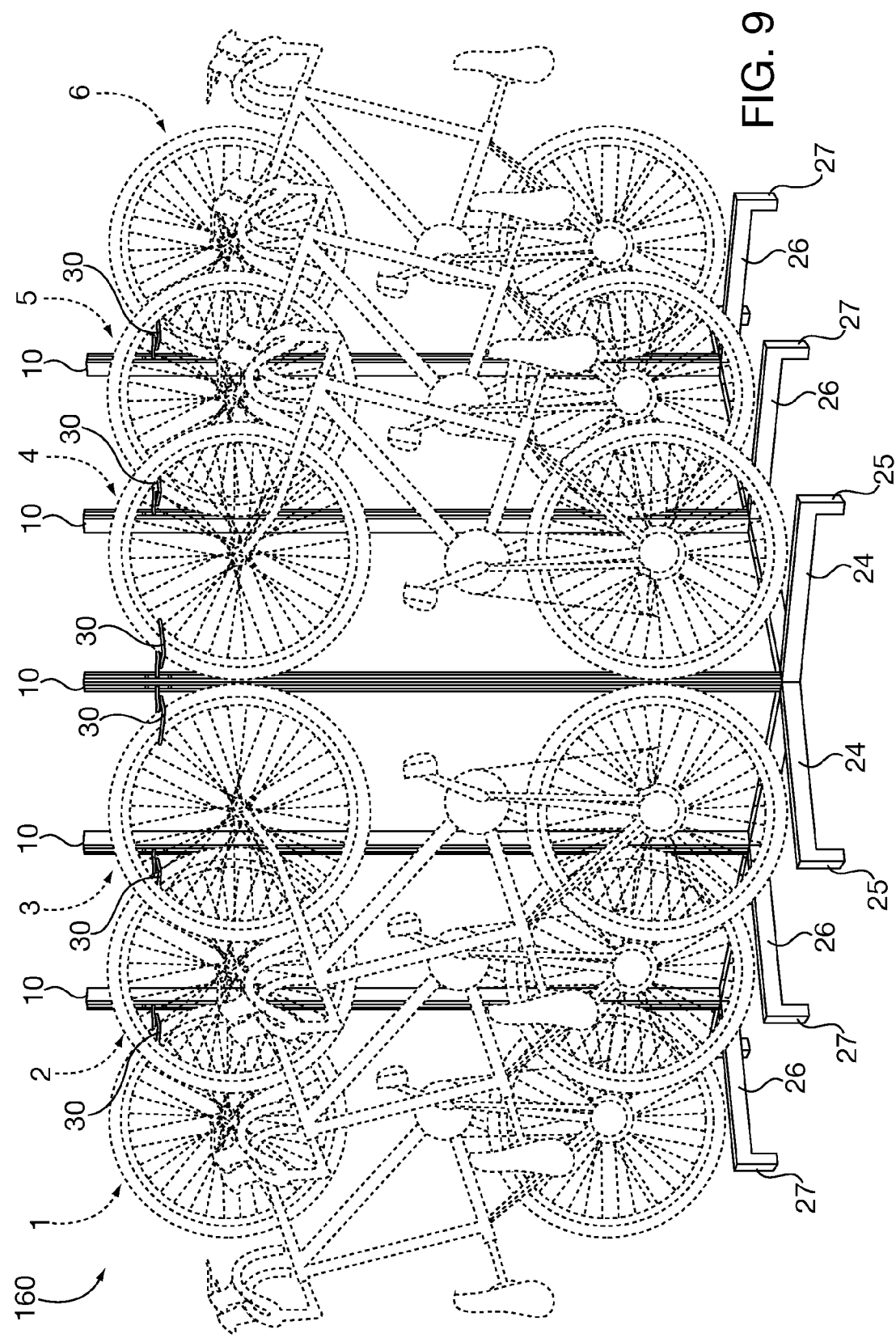
FIG. 9 is a perspective elevational view of an additional storage rack, in which multiple bicycles are stored in a side-by-side arrangement.

The principles used to construct bicycle racks for one and two bicycles, as described above, may be further extrapolated to create bicycle racks for three or more bicycles, as shown in FIGS. 7 through 9.

FIG. 7 shows a bicycle rack 140 in which three bicycles 1, 2, 3 are positioned in a side-by-side arrangement, each of the bicycles 1, 2, 3 being supported by its own vertical support member 10 and hook 30. In this variation, the leg 24 extends along the length of the rack 140 and three additional legs 26 project from the longitudinal leg 24 at right angles thereto, each leg 26 being positioned beneath the rear wheel of a corresponding bicycle. It should be apparent that there is no requirement that all of the legs 26 project in the same direction away from the leg 24. For instance, although such a configuration would require more space, the centrally located support leg 26 may project from the opposite side of the leg 24, in which case the vertical support member 10 may also be re-oriented so that the trough 13 is facing the same direction.

Another variation is shown in FIG. 8, in which the bicycle rack 150 possesses a single vertical support member 10 that has been modified to include attachment troughs 13 on three surfaces. Each trough 13 is provided with its own hook 30 for receipt of a bicycle 1, 2, or 3. The bicycles 1, 2, 3 are oriented in a "tower" arrangement, in which each bicycle is positioned at a right angle to an adjacent bicycle. In this configuration, the legs 24, 26 may have approximately the same length as the diameter of the largest bicycle wheel being supported.

FIG. 9 illustrates a multi-bicycle rack system 160, in which multiple support members 10 are provided for supporting multiple bicycles 1-6. The bicycle rack 160 features a centrally located support member 10 to which two bicycles 3, 4 are secured at right angles to one another. The remaining bicycles are attached to their own vertical support members, though one may easily imagine the installation of additional bicycles opposite one or more of bicycles 1, 2, 5, and 6. The resulting V-shape of the rack 160 requires less storage space than conventional storage racks that orient the bicycles horizontally. As with the previous configurations, the legs 26 are oriented at right angles with respect to the leg 24 that extends the length of the rack 160.

In addition to storing bicycles using the hooks 30 described herein, it may also be possible to store auxiliary equipment (such as helmets, hats, gloves, backpacks, etc.) or other types of equipment (such as snowboards, skis, hockey sticks, golf bags, surfboards, etc.) using additional hooks 30, perhaps placed at different heights along the trough 13. It is further contemplated that a storage compartment could be utilized with the rack system such as baskets that can be fixed to the rack. Relatedly, in the rack configuration shown in FIG. 5, a locker-like compartment could be fixably attached in the region between the horizontally opposed vertical support member, thereby, allowing the storage of items without having to utilize any fixed hooks on the exterior surface of the vertical members.

The preceding discussion merely illustrates the principles of the present bicycle storage systems. It will thus be appreciated that those skilled in the art may be able to devise various arrangements, which, although not explicitly described or shown herein, embody the principles of the inventions and are included within their spirit and scope. Furthermore, all examples and conditional language recited herein are principally and expressly intended to be for educational purposes and to aid the reader in understanding the principles of the inventions and the concepts contributed by the inventor to furthering the art and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

This description of the exemplary embodiments is intended to be read in connection with the figures of the accompanying drawings, which are to be considered part of the entire description of the invention. The foregoing description provides a teaching of the subject matter of the appended claims, including the best mode known at the time of filing, but is in no way intended to preclude foreseeable variations contemplated by those of skill in the art.

I claim:

1. A free-standing bicycle rack for supporting a bicycle comprising: a base; a first vertical support member projecting from the base; and a hook attached to the vertical support member; the base comprising at least a first support leg and a second support leg spaced apart from the first support leg, and a second vertical support member, the second vertical support member being spaced a distance apart from the first vertical support member, a support leg being positioned between and connected to the first and second vertical support members, each vertical support member defining a trough and having a hook installed in the trough for supporting a bicycle in a vertical orientation; wherein the hook has a shape resembling the curved portion of a question mark and is arranged to occupy a horizontal plane when the vertical support member is in the vertical orientation, projects roughly equally to opposed sides of the vertical support member, and is configured to engage the front wheel of the bicycle and to hold the bicycle in a vertical orientation with the back wheel of the bicycle adapted to contact at least one of the vertical support member, the first support leg, and the second support leg.

2. The bicycle rack of claim 1, wherein the vertical support member comprises an attachment surface, the attachment surface defining a trough therein extending a portion of the length of the vertical support member; and wherein the hook is attached within the trough.

3. The bicycle rack of claim 2, wherein at least one threaded hole is defined within the trough and wherein an attachment end of the hook is provided with a correspondingly threaded end, the hook end being screwed into one of the at least one threaded holes.

4. The bicycle rack of claim 2, further comprising a universal slider attachment, the universal slider attachment comprising a plate sized to slidably fit within the trough, the plate defining therethrough an aperture for receipt of a hook end and further defining at the distal ends thereof teeth for engaging the trough.

5. The bicycle rack of claim 1, further comprising a third support leg opposite the first support leg.

6. The bicycle rack of claim 1, the vertical support member further comprising a second attachment surface and a second trough defined by the second attachment surface, the bicycle rack further comprising a second hook for holding a second bicycle in a vertical orientation.

7. The bicycle rack of claim 6, wherein the second attachment surface is adjacent the first attachment surface, such that the positions of the first bicycle and the second bicycle define a right angle.

8. The bicycle rack of claim 6, wherein the second attachment surface is opposite the first attachment surface, such that the position of the first bicycle and the second bicycle are back-to-back.

9. The bicycle rack of claim 6, wherein the vertical support member further comprises a third attachment surface and a third trough defined in the third attachment surface, the bicycle rack further comprising a third hook for holding a third bicycle in a vertical orientation opposite one of the first and second bicycles.

10. The bicycle rack of claim 1, further comprising a third vertical support member, the third vertical support member being spaced a distance apart from the second vertical support member, a support leg being positioned between and connected to the second and third vertical support members, the third vertical support member defining a trough and having a hook installed in the trough for supporting a third bicycle in a vertical orientation.

* * * * *